R. G. McCLURE.
Wardrobe-Bedstead.

No. 160,833 — Patented March 16, 1875.

WITNESSES:

INVENTOR:
Robt. G. McClure
BY
ATTORNEYS.

UNITED STATES PATENT OFFICE.

ROBERT G. McCLURE, OF JAMESTOWN, OHIO.

IMPROVEMENT IN WARDROBE-BEDSTEADS.

Specification forming part of Letters Patent No. 160,833, dated March 16, 1875; application filed October 3, 1874.

*To all whom it may concern:*

Be it known that I, ROBERT G. MCCLURE, of Jamestown, Greene county, Ohio, have invented an Improvement in Wardrobe-Bedsteads, of which the following is a specification:

The invention will first be fully described, and then pointed out in the claim.

Figure 1:
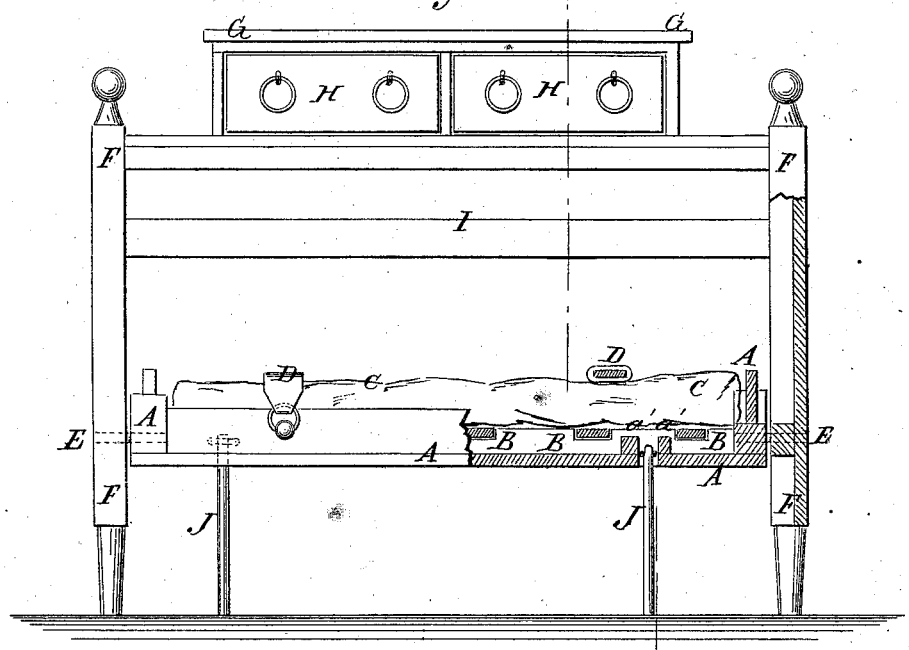
Figure 2:
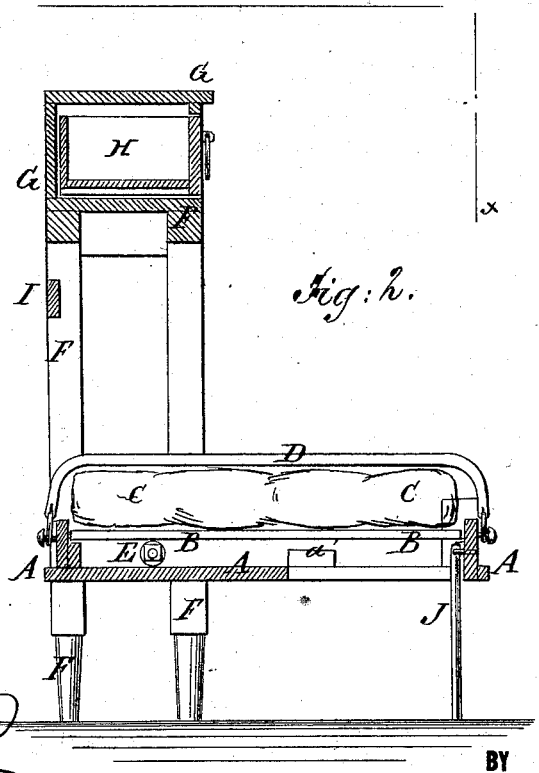

Figure 1 of drawing is a front view, and Fig. 2 a cross-section.

A represents the bed-bottom; B, the cross-slats, and C the mattress. D are straps for the purpose of holding the bed, and preventing it from bulging when turned up, the same being stiffened in the middle, while their ends remain flexible, and are provided with loops that fasten over headed pins, knobs, or some equivalent device on the side boards of bed-bottom.

This device prevents all bulge in the bed, and holds it securely in position when turned up.

What I claim is—

The straps D, rigid in the middle, flexible at each end, and provided with end loops, in combination with a bed-bottom, for the purpose specified.

ROBERT G. McCLURE.

Witnesses:
    D. B. WILLIAMS,
    WILLIAM MOSES.